(12) United States Patent
Hu et al.

(10) Patent No.: US 10,962,770 B2
(45) Date of Patent: Mar. 30, 2021

(54) METHOD FOR CONTROLLING CAMERA EXPOSURE TO AUGMENT A WIPER SYSTEM OF A SENSOR ENCLOSURE

(71) Applicant: PONY AI Inc., Grand Cayman, KY (US)

(72) Inventors: Zhongnan Hu, Palo Alto, CA (US); Zuoteng Chen, San Jose, CA (US); Nengxiu Deng, Fremont, CA (US); Cheng Jin, Fremont, CA (US); Kai Chen, San Jose, CA (US); Yubo Zhang, Los Gatos, CA (US); Xiang Yu, Santa Clara, CA (US); Tiancheng Lou, Milpitas, CA (US); Jun Peng, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 219 days.

(21) Appl. No.: 16/179,720

(22) Filed: Nov. 2, 2018

(65) Prior Publication Data

US 2020/0142187 A1    May 7, 2020

(51) Int. Cl.
*G02B 27/00* (2006.01)
*B60S 1/08* (2006.01)
*B60S 1/56* (2006.01)
*B60R 11/04* (2006.01)
*G05D 1/02* (2020.01)

(52) U.S. Cl.
CPC .......... *G02B 27/0006* (2013.01); *B60R 11/04* (2013.01); *B60S 1/0848* (2013.01); *B60S 1/56* (2013.01); *G05D 1/0231* (2013.01)

(58) Field of Classification Search
None
See application file for complete search history.

(56) References Cited

U.S. PATENT DOCUMENTS

| | | | |
|---|---|---|---|
| 9,937,876 B2 | 4/2018 | Bingle et al. | |
| 2002/0135468 A1* | 9/2002 | Bos | H04N 7/183 340/436 |
| 2006/0157639 A1* | 7/2006 | Shaffer | G06T 5/50 250/208.1 |
| 2016/0171715 A1* | 6/2016 | Matson | G06K 9/46 382/103 |
| 2017/0064175 A1* | 3/2017 | Furutake | H04N 5/3572 |
| 2017/0212983 A1* | 7/2017 | Cai | G16B 40/00 |
| 2018/0201273 A1* | 7/2018 | Xiao | G05D 1/0246 |
| 2018/0376054 A1* | 12/2018 | Patel | H04N 5/232 |
| 2019/0186931 A1 | 6/2019 | Dittmer et al. | |
| 2019/0188502 A1* | 6/2019 | Hermalyn | G06K 9/00818 |
| 2019/0281202 A1 | 9/2019 | Chen et al. | |

* cited by examiner

*Primary Examiner* — Jennifer D. Carruth
(74) *Attorney, Agent, or Firm* — Sheppard Mullin Richter & Hampton LLP

(57) ABSTRACT

A computer implemented method for controlling camera exposure to augment a wiper system of a sensor enclosure. The computer implemented method can detect a presence of a wiper in one or more images captured by one or more cameras. An exposure time of the one or more cameras can be adjusted. Wiper speed can be adjusted such that wipers move in and out of one or more field of views of the one or more cameras while the one or more cameras are capturing images.

16 Claims, 10 Drawing Sheets

360

METHOD FOR CONTROLLING CAMERA EXPOSURE TO AUGMENT A WIPER SYSTEM OF A SENSOR ENCLOSURE

FIELD OF THE INVENTION

This disclosure relates to a method for controlling camera exposure to augment a wiper system of a sensor enclosure associated with autonomous vehicles. More particularly, the present disclosure relates to dynamically adjusting exposure of cameras encased in the sensor enclosure to minimize wiper interference with camera operations.

BACKGROUND

In general, autonomous vehicles rely on myriad of information obtained from sensors to determine operations to be taken next (e.g., turning, accelerating, breaking, etc.). Such sensors can include light detection and ranging sensors (LiDARs), cameras, and radars, to name some examples. Often, these sensors are mounted exteriorly to an autonomous vehicle. Such a configuration can be undesirable because it exposes the sensors to harsh environmental conditions (e.g., temperature swing, radiation, oxidation, etc.), and thereby may prematurely shorten a sensor's lifetime. Furthermore, mounting the sensors exteriorly to the autonomous vehicle can subject the sensors to an increased risk of impact or damage from road debris. To alleviate these and other problems, a sensor enclosure may be utilized such that sensors can be encased in the sensor enclosure. The sensor enclosure can offer additional protection against environmental elements and road debris while still allowing the encased sensors to function or operate. However, encasing sensors in a sensor enclosure can create other challenges. For example, while driving in rain or snow, an outer surface (e.g., a cover) of the sensor enclosure may collect moisture (e.g., rainwater, snow, etc.). The moisture can accumulate on the outer surface and may interfere with operations of sensors.

Under traditional approaches, a system comprising one or more moving wipers can be utilized to remove the moisture accumulated on the outer surface of the sensor enclosure. However, under such approaches, the wipers may interfere with sensor operations. For example, the wipers may be present in field of views of cameras while the cameras are actively capturing image data. To overcome this issue, a wiper system can be designed such that wiper rotations are synchronous with sensor operations so the wipers do not interfere with sensor operations. However, such a solution can overstress the wiper system. An alternative approach is discussed herein.

SUMMARY

Described herein is a method of controlling camera exposure to augment a wiper system that removes moisture accumulated on a cover of a sensor enclosure.

As discussed, a sensor enclosure can be utilized to protect sensors from various environmental conditions and debris. However, such a configuration can also create operational challenges. For example, during raining or snowing condition, moistures (e.g., rainwater or melted snow) may accumulate on an outer surface of the sensor enclosure. These moistures can interfere with operations of the sensors. For example, the rainwater may prevent cameras from capturing clear images. Traditionally, a wiper system can be used to remove moistures accumulated on the outer surface of the sensor enclosure. However, because wiper rotation and sensor operation are not interdependent, often times, the wipers can interfere with the sensors. For example, the wipers may be in field of views of the cameras and thus block a portion of images collected by the cameras. The present disclosure addresses this and other issues described. In one embodiment, the present disclosure describes a computer implemented method for controlling camera exposure to augment a wiper system of a sensor enclosure. The computer implemented method can detect a presence of a wiper in one or more images captured by one or more cameras. An exposure time of the one or more cameras can be adjusted. Wiper speed can be adjusted such that wipers move in and out of one or more field of views of the one or more cameras while the one or more cameras are capturing images.

In some embodiments, the adjusting the exposure time of the one or more cameras comprises increasing the exposure time of the one or more cameras.

In some embodiments, the increasing the exposure time of the one or more cameras comprises decreasing shutter speeds of the one or more cameras.

In some embodiments, the increasing the exposure time of the one or more cameras further comprises decreasing ISO settings of the one or more cameras.

In some embodiments, the adjusting wiper speed such that wipers move in and out of one or more field of views of the one or more cameras comprises increasing the wiper speed of the wipers.

In some embodiments, the wiper system can be configured to capture images based on the adjusted exposure time and the adjusted wiper speed. The captured images can be processed, using at least one processing technique, to reduce motion blur.

In some embodiments, the at least one processing technique includes one of image processing or machine learning technique.

In some embodiments, the image processing technique includes using one of Lucy-Richardson or Wiener deconvolution technique.

In some embodiments, the machine learning technique includes using a convolutional neural network.

In some embodiments, the wipers comprise three wipers offset to +/−120 degrees from one another.

These and other features of the apparatus disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the inventions.

BRIEF DESCRIPTION OF THE DRAWINGS

Certain features of various embodiments of the present inventions are set forth with particularity in the appended claims. A better understanding of the features and advantages of the inventions will be obtained by reference to the following detailed description that sets forth illustrative embodiments, in which the principles of the invention are utilized, and the accompanying drawings of which:

Figure 1A:
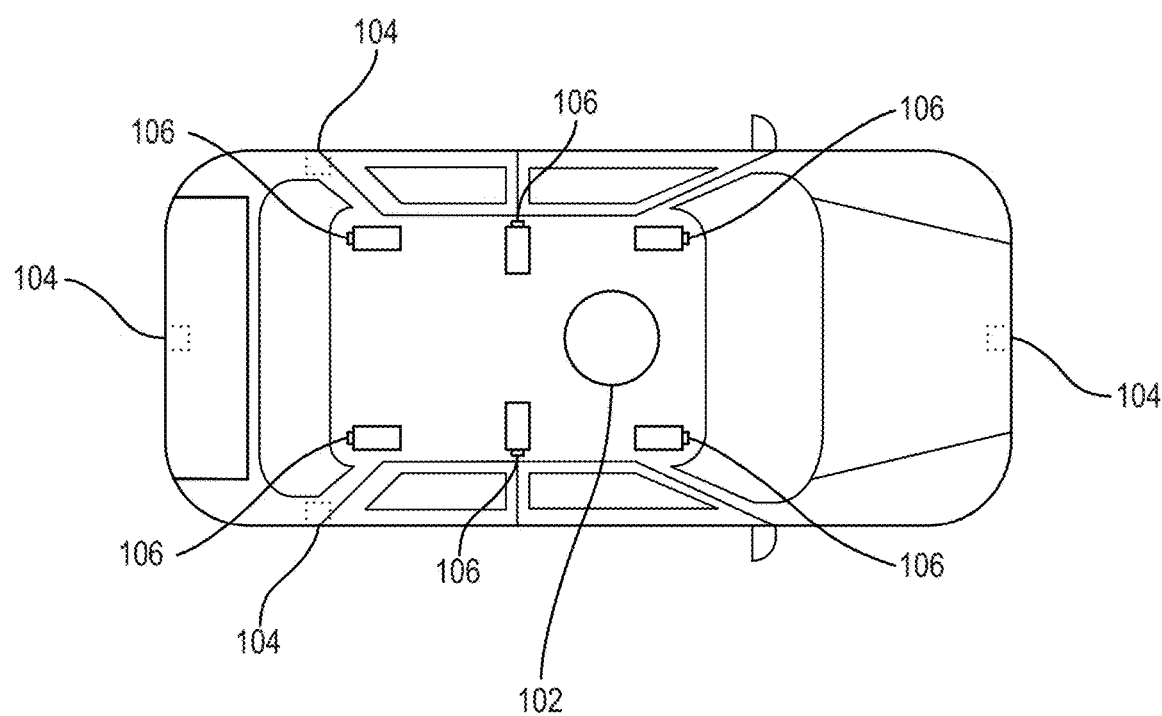
FIGS. 1A and 1B illustrate example autonomous vehicles, according to an embodiment of the present disclosure.

The figures depict various embodiments of the disclosed apparatus for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

An autonomous vehicle is equipped with complex sensors, data acquisition systems, actuation systems, and computing systems to enable the autonomous vehicle to operate without human involvement. These sensors can include light detection and ranging sensors (LiDARs), cameras, and radars, to name some examples. Often, sensors are mounted exteriorly to an autonomous vehicle. Such a configuration is not ideal because mounting the sensors exteriorly expose the sensors to harsh environmental conditions (e.g., temperature swings, radiation, oxidation, etc.). These harsh conditions can prematurely shorten a sensor's lifetime. Furthermore, this configuration subjects the sensors to an increased risk of impact or damage from road debris. It is therefore desirable to encase sensors in a sensor enclosure that provides additional protection against environmental conditions, as well as, potential impacts from road debris.

Although a sensor enclosure can provide additional protection for sensors, the sensor enclosure may also create other challenges. For example, while driving under raining or snowing conditions, an outer surface of the sensor enclosure can collect moisture (e.g., rainwater, snow, etc.). The moisture can accumulate on the outer surface and interfere with operation of sensors. For example, the moisture may interfere with laser pulses emitted from a LiDAR. In another example, the moisture accumulated on the outer surface may distort images captured by cameras. In some cases, moistures such as rainwater may create artificial artifacts on images captured by the cameras. These artificial artifacts, in some cases, may require further processing to be removed from the images.

Under traditional approaches, a system comprising one or more moving wipers can be utilized to remove the moisture accumulated on the outer surface of the sensor enclosure. However, under such approaches, the wipers may interfere with operation of sensors encased by the sensor enclosure. For example, the wipers can interfere with collection of image data. For instance, wipers might be in field of views of cameras gathering image data. A claimed sensor enclosure overcomes problems specifically discussed above. In various embodiments, a computer implemented method for controlling camera exposure to augment a wiper system can detect a presence of a wiper in one or more images captured by one or more cameras. An exposure time of the one or more cameras can be adjusted. Wiper speed can be adjusted such that wipers move in and out of one or more field of views of the one or more cameras while the one or more cameras are capturing images.

FIG. 1A illustrates an example autonomous vehicle 100, according to an embodiment of the present disclosure. An autonomous vehicle 100 generally refers to a category of vehicles that are capable of sensing and driving in an environment by itself. The autonomous vehicle 100 can include myriad of sensors (e.g., LiDARs, cameras, radars, etc.) to detect and identify objects in an environment. Such objects may include, but not limited to, pedestrians, road signs, traffic lights, and/or other vehicles, for example. The autonomous vehicle 100 can also include myriad of actuators to propel the autonomous vehicle 100 navigate around the environment. Such actuators may include, for example, any suitable electro-mechanical devices or systems to control a throttle response, a braking action, a steering action, etc. In some embodiments, the autonomous vehicle 100 can recognize, interpret, and comprehend road signs (e.g., speed limit, school zone, construction zone, etc.) and traffic lights (e.g., red light, yellow light, green light, flashing red light, etc.). For example, the autonomous vehicle 100 can adjust vehicle speed based on speed limit signs posted on roadways. In some embodiments, the autonomous vehicle 100 can determine and adjust a speed at which the autonomous vehicle 100 is traveling in relation to other objects in the environment. For example, the autonomous vehicle 100 can maintain a constant, safe distance from a vehicle ahead (e.g., adaptive cruise control). In this example, the autonomous vehicle 100 maintains this safe distance by constantly adjusting its vehicle speed to that of the vehicle ahead.

In various embodiments, the autonomous vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein.

In general, the autonomous vehicle 100 can effectuate any control to itself that a human driver can on a conventional vehicle. For example, the autonomous vehicle 100 can accelerate, brake, turn left or right, or drive in a reverse direction just as a human driver can on a conventional vehicle. The autonomous vehicle 100 can also sense environmental conditions, gauge spatial relationships (e.g., distances between objects and itself), detect and analyze road signs just as the human driver. Moreover, the autonomous vehicle 100 can perform more complex operations, such as parallel parking, parking in a crowded parking lot, collision avoidance, etc., without any human input.

In various embodiments, the autonomous vehicle 100 may include one or more sensors. As used herein, the one or more sensors may include laser scanning systems (e.g., LiDARs) 102, radars 104, cameras 106, and/or the like. The one or more sensors allow the autonomous vehicle 100 to sense an environment around the autonomous vehicle 100. For example, the LiDARs 102 can generate a three dimensional map of the environment. The LiDARs 102 can also detect objects in the environment. In another example, the radars 104 can determine distances and speeds of objects around the autonomous vehicle 100. In another example, the cameras 106 can capture and process image data to detect and identify objects, such as road signs, as well as deciphering content of the objects, such as speed limit posted on the road signs.

In the example of FIG. 1A, the autonomous vehicle 100 is shown with a LiDAR 102 coupled to a roof or a top of the autonomous vehicle 100. The LiDAR 102 can be configured to generate three dimensional maps of an environment and detect objects in the environment. In the example of FIG. 1A, the autonomous vehicle 100 is shown with four radars 104. Two radars are coupled to a front-side and a back-side of the autonomous vehicle 100, and two radars are coupled to a right-side and a left-side of the autonomous vehicle 100. In some embodiments, the front-side and the back-side radars can be configured for adaptive cruise control and/or accident avoidance. For example, the front-side radar can be used by the autonomous vehicle 100 to maintain a safe distance from a vehicle ahead of the autonomous vehicle 100. In another example, if the vehicle ahead experiences a suddenly reduction in speed, the autonomous vehicle 100 can detect this sudden change in motion and adjust its vehicle speed accordingly. In some embodiments, the right-side and the left-side radars can be configured for blind-spot detection. In the example of FIG. 1A, the autonomous vehicle 100 is shown with six cameras 106. Two cameras are coupled to the front-side of the autonomous vehicle 100, two cameras are coupled to the back-side of the autonomous vehicle 100, and two cameras are couple to the right-side and the left-side of the autonomous vehicle 100. In some embodiments, the front-side and the back-side cameras can be configured to detect, identify, and decipher objects, such as cars, pedestrian, road signs, in the front and the back of the autonomous vehicle 100. For example, the front-side cameras can be utilized by the autonomous vehicle 100 to determine speed limits. In some embodiments, the right-side and the left-side cameras can be configured to detect objects, such as lane markers. For example, side cameras can be used by the autonomous vehicle 100 to ensure that the autonomous vehicle 100 drives within its lane.

Figure 1B:
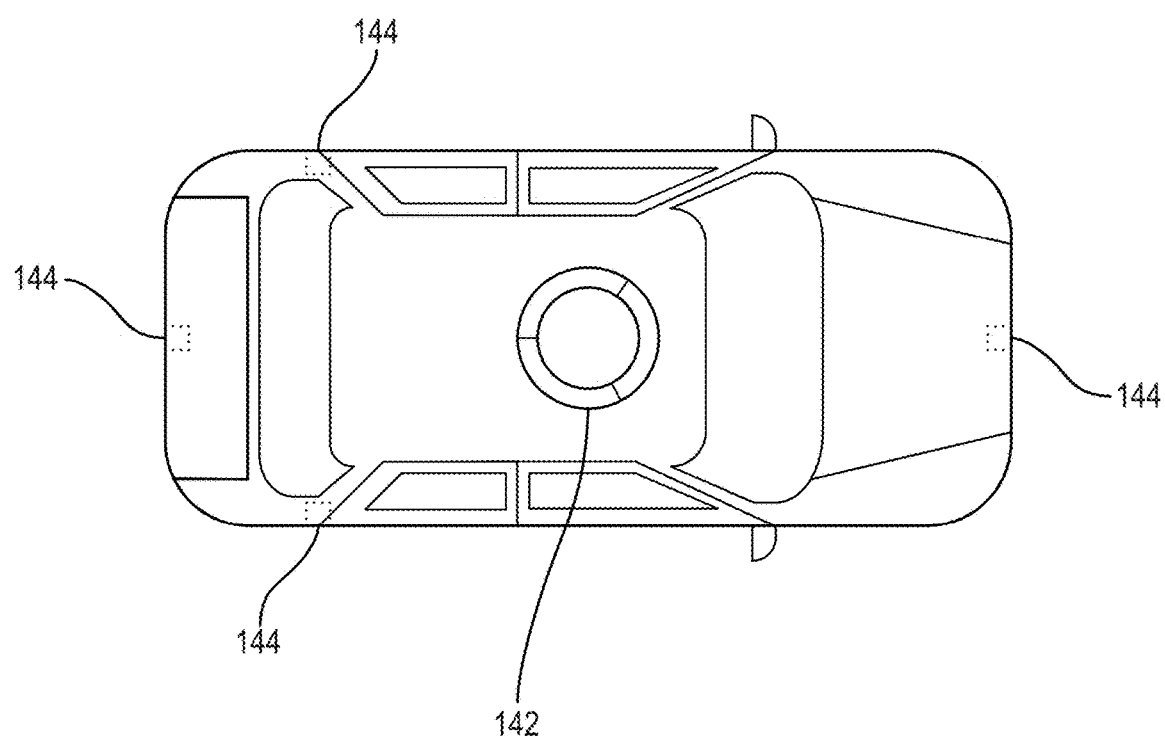

FIG. 1B illustrates an example autonomous vehicle 140, according to an embodiment of the present disclosure. In the example of FIG. 1B, the autonomous vehicle 140 is shown with a sensor enclosure 142 and four radars 144. The sensor enclosure 142 can include a LiDAR and one or more camera. As discussed, the sensor enclosure 142 can provide additional protection for the LiDAR and the one or more cameras against various environmental conditions while still allowing wavelengths of light receptive to the LiDAR and the one or more cameras to enter. In general, the LiDAR and the one or more cameras of the sensor enclosure 142 and the four radars work exactly same as the LiDAR, cameras, and radars discussed with respect with FIG. 1A. The sensor enclosure 142 will be discussed in further detail with references to FIG. 2A.

Figure 2A:
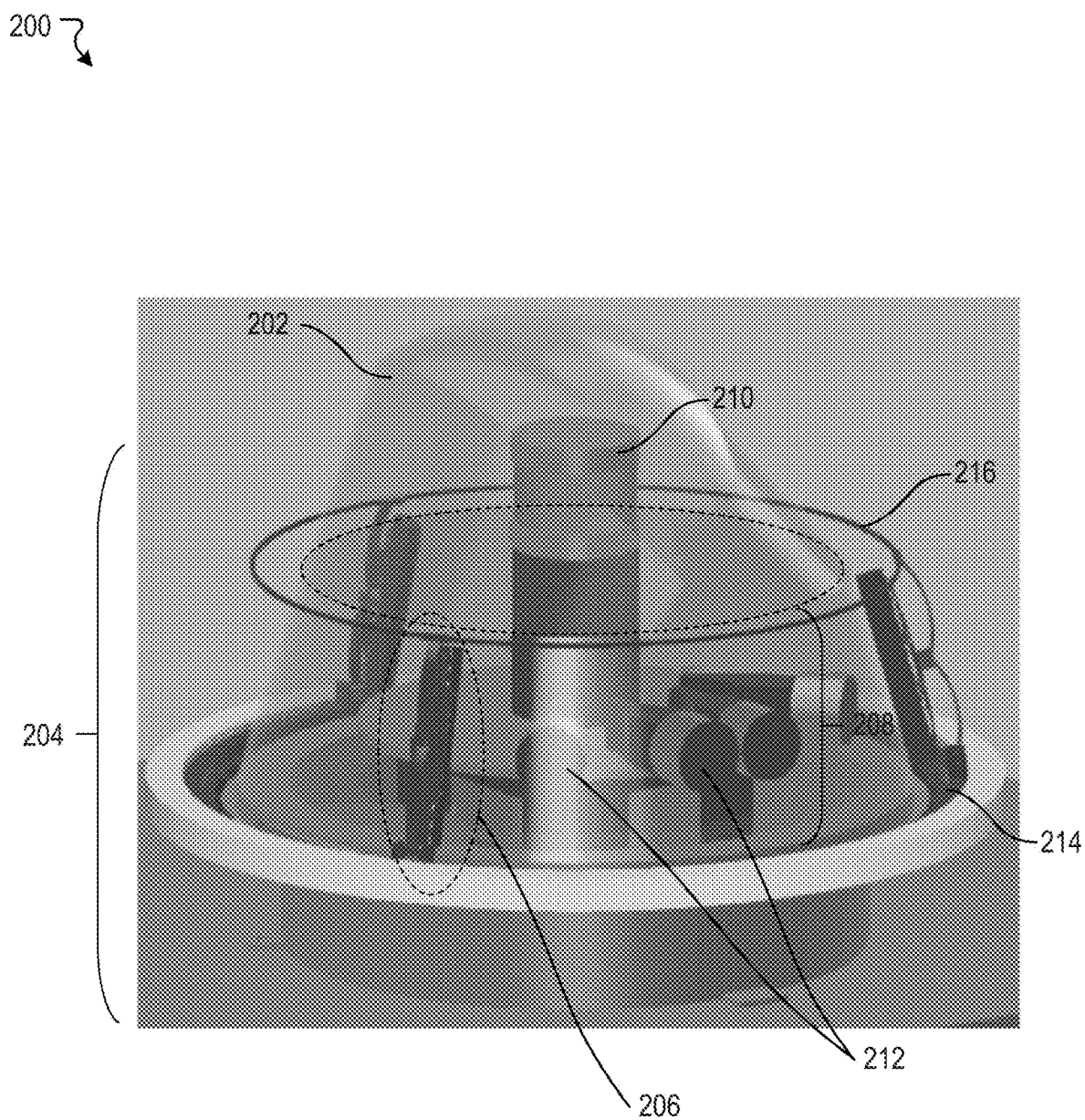
FIGS. 2A and 2B illustrate an example sensor enclosure, according to an embodiment of the present disclosure.

FIG. 2A illustrates an example sensor enclosure 200, according to an embodiment of the present disclosure. In some embodiments, the sensor enclosure 142 of FIG. 1B can be implemented as the sensor enclosure 200. In various embodiments, the sensor enclosure 200 can include a cover 202 and a base 204. The cover 202 generally has a circular dome shape that is disposed above the base 204. The cover 202 is generally made from transparent materials to allow sensors of an autonomous vehicle to operate. In some embodiments, the cover 202 can be operatively coupled to the base 204. For example, the cover 202 is detachable or removable from the base 204 to allow access to the sensors. The base 204 is a circular structure that extends into cavity of the cover 202. The sensors of the autonomous vehicle, such as a LiDAR 210 and cameras 212, can be housed, secured, or mounted to the base 204. In some embodiments, the base 204 can also include a wiper system. The wiper system comprises one or more wipers 206 disposed peripherally around the base 204. The one or more wipers 206 extend vertically from the base 204 and rest on the cover 202. The one or more wipers 206 have two ends. On a first end, the one or more wipers 206 are anchored to a rotating ring 214. On a second end, the one or more wipers 206 are anchored to a support ring 216. In various embodiments, the one or more wipers 206 of the wiper system can be rotated to remove moisture or debris accumulated on the cover 202. The rotation of the one or more wipers 206 can be synchronized with operation of the cameras 212 such that the one or more wipers 206 do not interfere with the operation of the cameras 212. Details of the rotation of the one or more wipers 206 will be discussed herein with respect to FIGS. 3A and 3B.

The cover 202 defines an outer contour, shape, or silhouette of the sensor enclosure 200. In general, because the sensor enclosure 200 is mounted exteriorly to the autonomous vehicle, it is desirable for the cover 202 to have a shape that has a low wind resistance or coefficient of drag to minimize negative impacts to fuel economy. For example, a cover 202 with an angular or circular shape is more desirable than a square or rectangular shape because the angular or circular shape generally has a lower wind resistance than the square or rectangular shape. In the example of FIG. 2A, the cover 202 is shown to generally have a truncated cone shape with an angled circular shape disposed above the truncated cone shape, but generally, the cover 202 can have any shape as required. The cover 202 can have a circular dome shape, for example. In various embodiments, the cover 202 can be made from any suitable material that allows the sensors in the sensor enclosure 200 to operate. Any material used to fabricate the cover 202 must be transparent to wavelengths of light (or electro-magnetic waves) receptive to the sensors. For example, for the LiDAR 210 to properly operate, the cover 202 must allow laser pulses emitted from the LiDAR 210 to pass through the cover 202 to reach a target and then reflect back through the cover 202 and back to the LiDAR 210. Similarly, for the cameras 212 to properly operate, the cover 202 must allow entry of visible light. In addition to being transparent to wavelengths of light, any suitable material must also be able to withstand potential impacts from roadside debris. In an implementation, the cover 202 can be made from acrylic glass (e.g., Cylux, Plexiglas, Acrylite, Lucite, Perspex, etc.). In another implementation, the cover 202 can be made from strengthen glass (e.g., Coring® Gorilla® glass). In yet another implementation, the cover 202 can be made from laminated safety glass held in place by layers of polyvinyl butyral (PVB), ethylene-vinyl acetate (EVA), or other similar chemical compounds. Many implementations are possible and contemplated.

In some embodiments, the cover 202 can be tinted with a thin-film neural filter to reduce transmittance to light entering the cover 202. For example, in an embodiment, a portion 208 of the cover 202 can be selectively tinted with the thin-film neutral filter to reduce intensity of visible light entering the portion 208. In this example, transmittance of light in other portion of the cover 202 is not affected. This configuration can be helpful, for example, to alter transmittance of light as seen by the cameras 212 while keeping transmittance of light seen by the LiDAR 210 same. In another embodiment, the portion 208 of the cover 202 can be tinted with a thin-film graduated neural filter in which transmittance to visible light varies along an axis. In yet another embodiment, the cover 202 can be completely treated or coated with a reflective coating such that inner of the sensor enclosure 200 is not visible from an outside vantage point while still being transparent to wavelengths of light receptive to the LiDAR 210 and the cameras 212 inside of the sensor enclosure 200. Many variations, such as adding a polarization layer or an anti-reflective layer, are possible and contemplated.

The base 204 provides a mechanical framework for the sensor enclosure 200. The base 204 can provide surfaces for which the LiDAR 210 and the cameras 212 can be mounted, anchored, or installed. The base 204 can also provide anchoring points for the one or more wipers 206. Furthermore, the base can house a powertrain mechanism that can be utilized to rotate the one or more wipers 206 of the wiper system. The base 204 will be discussed in further detail with references to FIG. 2B.

Figure 2B:
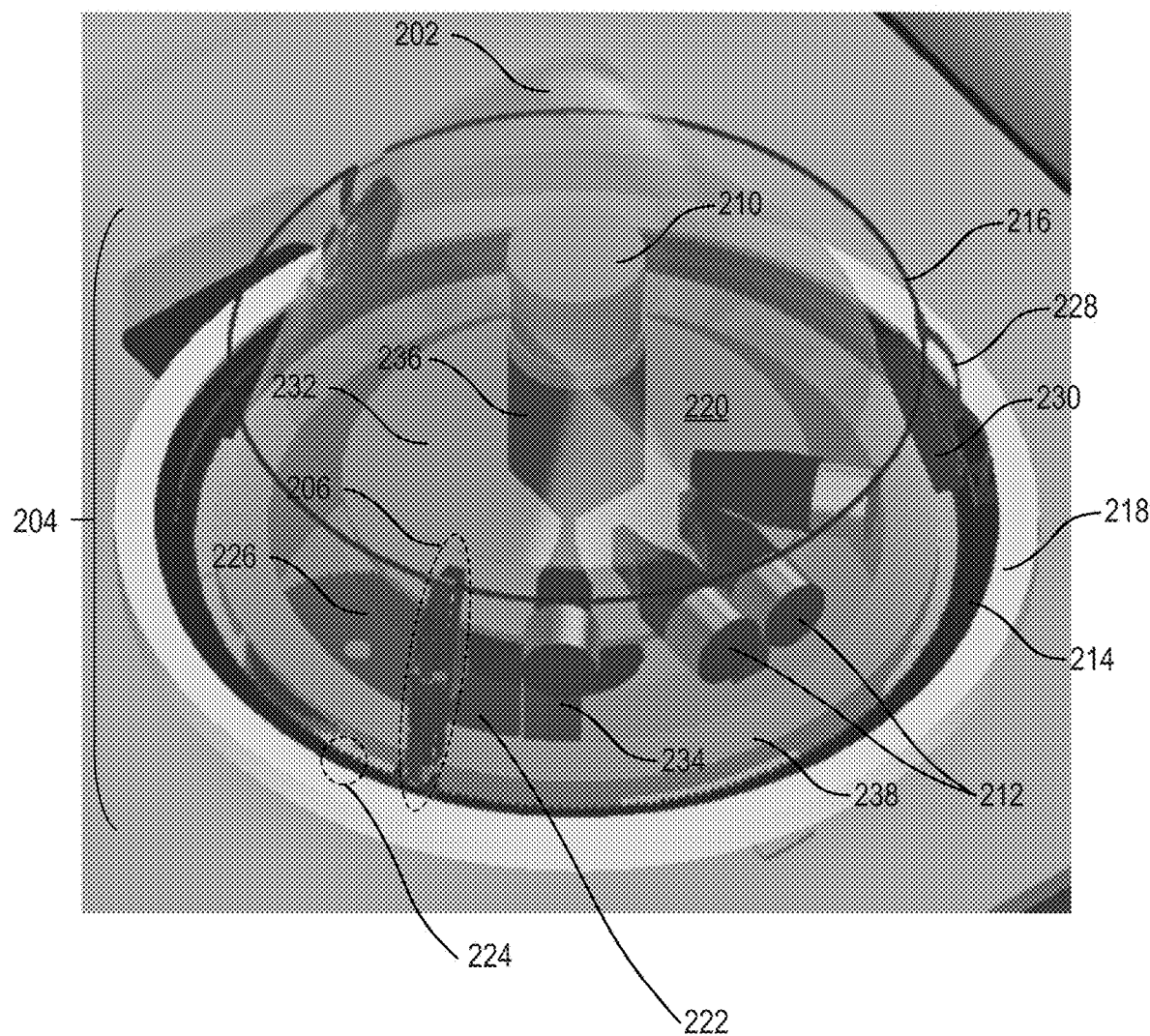

FIG. 2B illustrates another view of the sensor enclosure 200, according to an embodiment of the present disclosure. As shown in FIG. 2B, in various embodiments, the base 204 provides a mechanical framework for which various electro-mechanical components and sensors, such as the LiDAR 210 and the cameras 212, can be mounted, anchored, installed, or secured inside the sensor enclosure 200. The base 204 comprises an outer frame 218, an inner inner frame 220, and a powertrain 222. The outer frame 218 is a circular pan-like structure on which the inner frame 220 and the powertrain 222 are attached or mounted. The pan-like structure of the outer frame 218 creates spacing underneath the inner frame 220 to house various components, including the powertrain 222 and electronics that controls the powertrain 222. The outer frame 218 can include the rotating ring 214 disposed on an inner edge of the outer frame 218. The rotating ring 214 comprises two rings: an outer ring and an inner ring. In an embodiment, the rotating ring 214 can be implemented with a slew bearing. The two rings of the rotating ring 214 can be rotated about one another. In the example of FIG. 2B, the outer ring is rotationally fixed to the outer frame 218 while the inner ring can freely rotate. Furthermore, an inner surface of the inner ring can comprise a plurality of cogs 224 (or gear teeth). The plurality of cogs 224 can be coupled to a gear 226 of the powertrain 222 such that when the gear 226 rotates, as driven by the powertrain 222, the inner ring of the rotating ring 214 rotates as a result. Since the one or more wipers 206 are attached to the inner ring, as the inner ring rotates, the one or more wipers 206 rotate as a result. The outer frame 218 can also include a circular wall 238 on which the cover 202 can be mounted or installed. The circular wall 238 can have one or more cutouts through which the gear 226 can protrude out from the spacing of the outer frame 218 and be coupled to the cogs 224 of the rotating ring 214. As discussed, the one or more wipers 206 of the wiper system can extend vertically from the rotating ring 214 and disposed peripherally around the outer frame 218. Each wiper in the one or more wipers 206 has a first end and a second end. The first end of the wiper is anchored to the inner ring of the rotating ring 214 and the second end of the wiper is anchored to the support ring 216. Each wiper in the one or more wipers 206 comprises a leaf spring 228 and a wiper blade 230 connected to a middle of the leaf spring 228. The leaf spring 228, which is anchored to the inner ring of the rotating ring 214 and the support ring 216, provides compressive force that pushes the wiper blade 230 against the cover 202 (or conforms to a contour of the cover 202) and makes contact with the cover 202 of the sensor enclosure 200. This compressive force provides necessary friction to the wiper blade 230 such that when the one or more wipers 206 are rotated, the wiper blade 230, through the contact, can remove rainwater, snow, or any other debris from the cover 202. In the example of FIG. 2B, the outer frame 306 is shown to have three wipers offset to +/−120 degrees to each other.

In general, the outer frame 218 can be made from any suitable materials that can withstand extreme temperature swings and weather various environmental conditions (e.g., rain, snow, corrosion, oxidation, etc.). The outer frame 218 can be fabricated using various metal alloys (e.g., aluminum alloys, steel alloys, etc.) or carbon graphite. The outer frame 218 can also be fabricated using three dimensional printers with thermoplastics (e.g., polylactic acid, acrylonitrile butadiene styrene, polyamide, high impact polystyrene, thermoplastic elastomer, etc.). Many variations are possible.

In the example of FIG. 2B, the inner frame 220 is shown to include a circular platform 232 with support anchors 234 disposed underneath the circular platform 232 and a center block 236 disposed above the circular platform 232. The LiDAR 210 can be mounted on top of the center block 236. The cameras 214 can be mounted on the circular platform 232. In FIG. 2B, two cameras are shown to be pointed in a forward direction and two cameras are pointed at a +/−45 degrees offset from the forward direction. In general, any number of cameras can be mounted to the circular platform 232. The circular platform 232 is not limited to having four cameras as depicted in FIG. 2B. For example, in some embodiments, the circular platform 232 can have eight cameras arranged peripherally around the circular platform 232. Many variations are possible. The support anchors 234 anchor the circular platform 232 to the outer frame 218. In some embodiments, each support anchor 234 can include a leveling mechanism. The leveling mechanism can adjust a height of each support anchor 234. In some cases, the leveling mechanism can adjust height automatically. For example, an autonomous vehicle, while driving through potholes or damaged roads, may experience various vibrations. The vibrations experienced by the autonomous vehicle can translate to images captured by the cameras 212. In such cases, the leveling mechanism in each support anchor 234 can adjusts the height of each support anchor 234 to counteract the vibrations so that the vibrations introduced to the images are minimized. In some cases, the leveling mechanism in each support anchor 234 may preemptively adjust a height of the circular platform 232 in anticipation of an inclination or declination. For example, as the autonomous vehicle approaches an incline, the cameras 212 might not capture images of road conditions beyond the autonomous vehicle's current trajectory. Under such a scenario, the leveling mechanism in each support anchor 234 can be adjusted to tilt the circular platform 232 to elevate field of views of the cameras 212. In this example, the two front support anchors are raised while the two back support anchors are lowered. Similarly, if the autonomous vehicle is approaching a decline, the leveling mechanism in each support anchor 234 may proactively tilt the circular platform 232 to lower the field of views of the cameras 212. In this example, the front two support anchors are lowered while the back two support anchors are raised. Many variations are possible.

Similar to the outer frame 218, the inner frame 220 can be made from any suitable materials that can withstand extreme temperature swings and weather various environmental conditions (e.g., rain, snow, corrosion, oxidation, etc.). The inner frame 220 can be fabricated using various metal alloys (e.g., aluminum alloys, steel alloys, etc.) or carbon graphite. The inner frame 220 can also be fabricated using three dimensional printers with thermoplastics (e.g., polylactic acid, acrylonitrile butadiene styrene, polyamide, high impact polystyrene, thermoplastic elastomer, etc.). Many variations are possible.

As shown in the example of FIG. 2B, the powertrain 222 can be disposed between the inner frame 220 and the outer frame 218. In various embodiments, the powertrain 222 can be implemented with an electric motor. For example, the powertrain 222 can be implemented with a direct current brush or brushless motor, or an alternate current synchronous or asynchronous motor. The powertrain 222 can be connected to the gear 226. The powertrain 222 can rotate the inner ring of the rotating ring 214 clockwise or counter-clockwise through the gear 226 coupled to the cogs 224 of the inner ring. In some embodiments, the base 204 can include a moisture sensor (not shown). The moisture sensor can be configured to detect rainwater accumulated on the cover 202 of the sensor enclosure 200. Depending on the amount of moisture or rainwater detected, the powertrain 222 can vary its rotational speed. For example, for a slight rain, the powertrain 222 rotates the one or more wipers 206 at lower speeds. However, if rain intensity increases, the powertrain 222 correspondingly rotates the one or more wipers 206 at a faster speed.

In general, an exposure (e.g., amount of light) of a camera can be controlled in various ways. A shutter speed of the camera can be varied to control amount of light seen by the camera. For example, in a brightly lit environment, the shutter speed can be fast (e.g., a short exposure time) to limit amount of light entering the camera and to avoid over exposing an image. Alternatively, in a low light environment, the shutter speed can be slow (e.g., a long exposure time) to allow more light entering the camera and to avoid under exposing an image. In some cases, the exposure of the camera can also be modified by an ISO setting of the camera. For example, for a given shutter speed and under a low light condition, the ISO setting can be set high in order to increase the camera's sensitivity to capturing light and to compensate the low light condition. However, this increase in the ISO setting comes at an expense of having more sensor noise on images (e.g., grainier images). For the same given shutter speed, but under a bright light condition, the ISO setting can be set low to minimize sensor noise. In various embodiments, shutter speeds and ISO settings of the cameras 212, along with wiper speeds can be adjusted dynamically or in real-time to minimize interference from the one or more wipers 206 to images collected by the cameras 212. Details of this method will be discussed in detail with references to FIG. 3A.

Figure 3A:
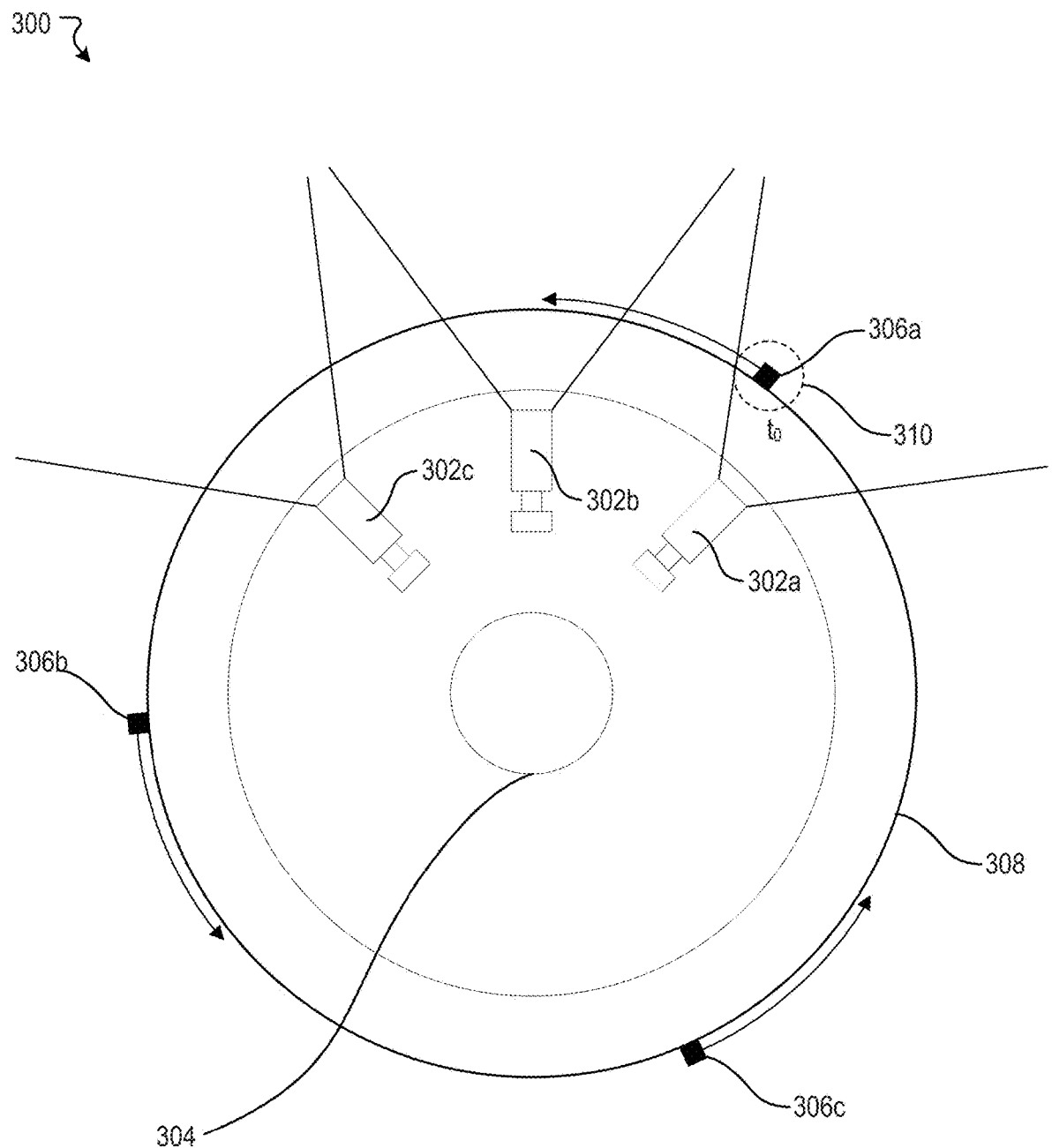
FIG. 3A illustrates an example wiper system in operation, according to an embodiment of the present disclosure.

FIG. 3A illustrates an example wiper system 300 in operation, according to an embodiment of the present disclosure. In the example of FIG. 3A, three cameras 302a-302c are disposed peripherally in a frontal position about a center of an sensor enclosure (e.g., the sensor enclosure 200 of FIGS. 2A and 2B) on a circular platform (e.g., the circular platform 232 of FIG. 2B). A LiDAR 304 is disposed at the center, above the three cameras 302a-302c. In this example, three wipers 306a-306c are disposed peripherally on a cover 308 of the sensor enclosure (e.g., the cover 202 of FIGS. 2A and 2B). As discussed, each wiper can comprise a leaf spring that provides compressive force to a wiper blade to make contact with the cover 308. Furthermore, in this example, the three wipers 306a-306c are offset to +/−120 degrees with respect to one another. In the example of FIG. 3A, the cameras 302a-302c are operating under normal or default ISO settings and shutter speeds. At some time, $t=t_0$, while the cameras 302a-302c are actively capturing images, a wiper 306a moves (or rotates) to a location 310 that is within a field of view of a camera 302a. When the wiper 306a is seen or detected in an image captured by the camera 302a, the wiper system 300 can automatically configure the cameras 302a-302c to increase the cameras' exposure times. In general, a camera's exposure time can be increased by decreasing the camera's ISO setting and shutter speed. Lowering the ISO setting decreases the camera's sensitivity to light, thus allowing the camera to capture a scene (or light) longer. Decreasing the shutter speed allows an aperture of the camera to remain open for longer, thus allowing the camera to expose an image for longer. The wiper system 300, upon detecting the wiper 306a in the image, can additionally increase wiper speed such that the wipers 306a-306c can move across field of views of the cameras 302a-302c at a faster rate than before. The key, here, is that the time it takes for the wipers 306a-306c to move across the field of views of the cameras 302a-302c must be shorter than the exposure times for the cameras 302a-302c. In other words, the cameras 302a-302c must be actively capturing images while the wipers 306a-306c move in and out of the cameras' field of views or else the wipers 306a-306c will be seen in the images captured by the cameras 302a-302c. By increasing the exposure times, the demand for the wiper 306a-306c to move across the field of views can be relaxed—i.e., it gives more time for the wipers 306a-306c to move or rotate in and out of the field of views and thereby reduces stress to a powertrain (e.g., the powertrain 222 of FIG. 2B) to drive the wipers 306a-306c at high wiper speeds.

This approach of increasing camera exposure time to minimize wiper interference also has drawbacks. For example, increasing the exposure time may cause the cameras 302a-302c to capture images that are fuzzy or blurry (e.g., motion blur). Therefore, in some embodiments, post image processing is needed to reduce motion blur in the captured images. For example, image processing techniques, such as Lucy-Richardson deconvolution, Wiener deconvolution, or other image deconvolution techniques, can be applied to the captured images to reduce motion blur. In some embodiments, machine learning techniques, such as convolutional neural network technique, can be used to reduce motion blur in the captured images. In some embodiments, the cameras 302a-302c can be stabilized to reduce motion blur caused by various vibrations experienced by the sensor enclosure. In one implementation, leveling mechanisms (e.g., the leveling mechanisms discussed with respect to FIG. 2B) in conjunction with a level sensor can be configured to automatically counter-act the various vibrations such that the circular platform for which the cameras 302a-302c are mounted remains relatively flat and free from vibrations. The level sensor, in various embodiments, can be configured to detect vibrations in various directions. For example, the level sensor can detect a vibration in a vertical direction (e.g., a Z-axis in a Cartesian coordinates). In various embodiments, the level sensor can be implemented with a gyroscope (e.g., a three axis gyroscope) and/or an accelerometer. Any vibration (or acceleration) experienced by the circular platform can be detected by the level sensor. The level sensor can relay this information to one or more leveling mechanisms coupled to the circular platform. The one or more leveling mechanisms, based on the vibration information, can provide actuations to counter-act, eliminate, or minimize translations of the various vibrations to the circular platform. Furthermore, in some implementations, the vibration information measured by the leveling sensor can be used by various image processing or machine learning techniques to reduce motion blur.

Figure 3B:
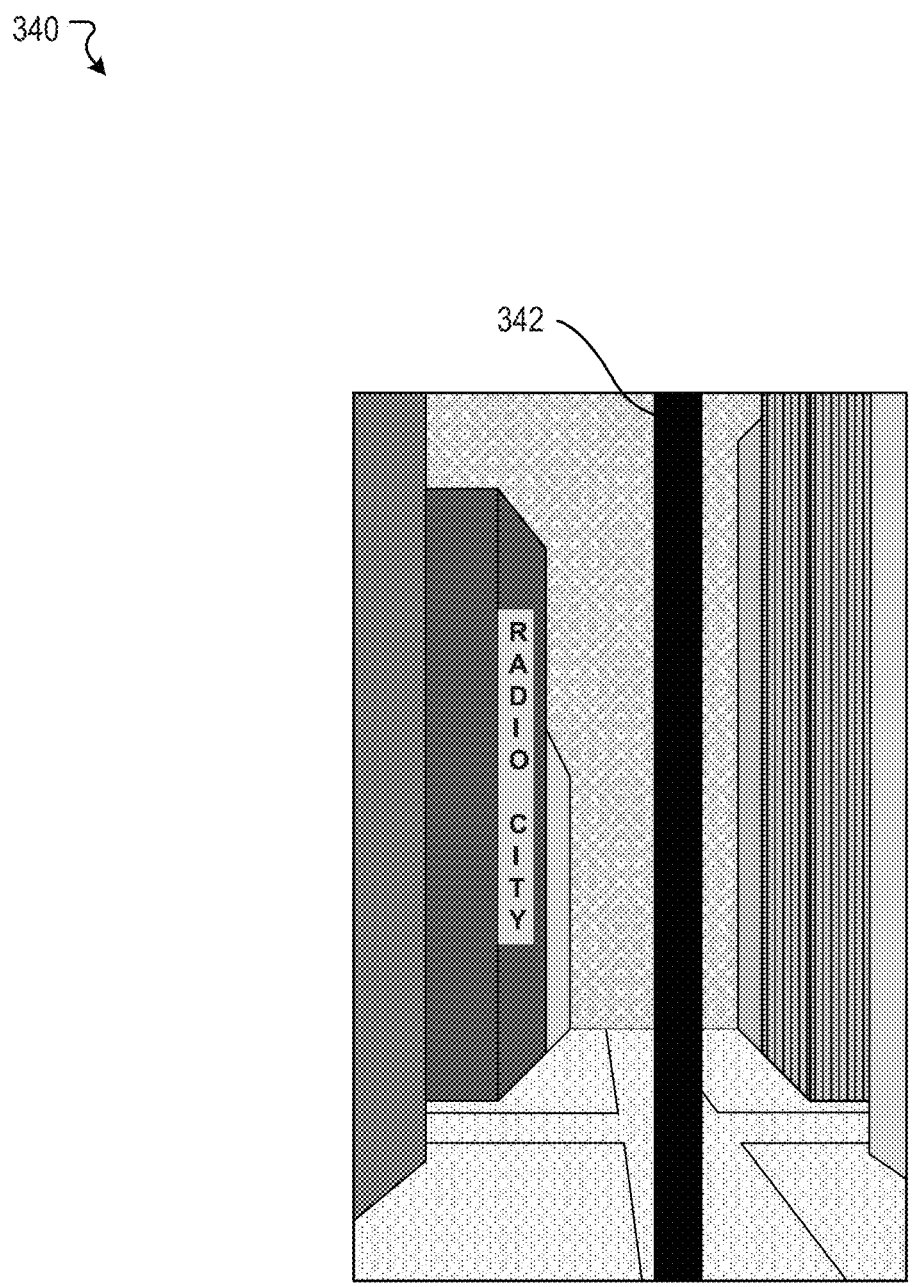
FIG. 3B illustrates an example image captured by a camera where a wiper system interferes with the camera, according to an embodiment of the present disclosure.
Figure 3C:
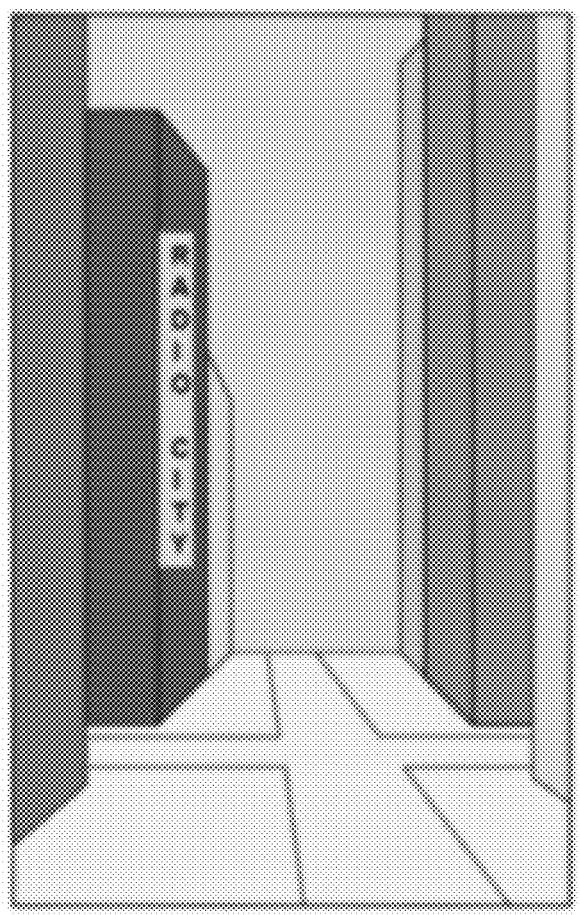
FIG. 3C illustrates an example image captured by a camera while a wiper system is in operation and where an exposure time for the camera is increased, according to an embodiment of the present disclosure.

FIG. 3B illustrates an example image 340 captured by a camera where a wiper system interferes with the camera, according to an embodiment of the present disclosure. The example image 340 depicts a scene captured by the camera encased by a sensor enclosure. In this example, the camera is operating under normal or default ISO setting and shutter speed. Further, in this example, a wiper 342 is detected or seen in the example image 340. Under such a case, as discussed above, the ISO setting and the shutter speed associated with the camera are decreased to increase camera exposure time. At the same time, wiper speed of the wiper 342 is also increased so that the wiper 342 can move across a field of view of the camera faster. As discussed, allowing the wiper 342 to move across the field of view while the camera is still capturing an image eliminates having the wipe 342 be seen in subsequent images captured by the camera but at an expense of having fuzzy or blurry images. FIG. 3B depicts an image 360 in which the camera's exposure time has been increased while the wipers are in operation. The image 360 depicts the same scene as the image 340. As shown in FIG. 3B, the image 360 is fuzzy or blurry (e.g., motion blur) due to the increased camera exposure and while having wipers passing by. As discussed above, image processing techniques or machine learning techniques can be used to reduce motion blur and sharpen images.

Figure 4:
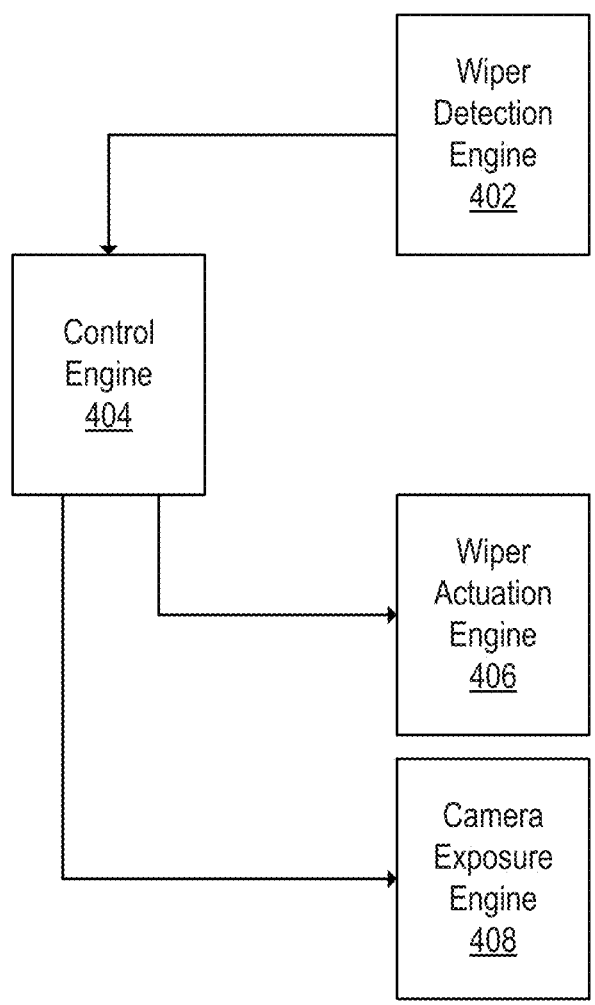
FIG. 4 illustrates an example control diagram, according to an embodiment of the present disclosure.

FIG. 4 illustrates an example control diagram 400, according to an embodiment of the present disclosure. The control diagram 400 can include a wiper detection engine 402, a control engine 404, a wiper actuation engine 406, and a camera exposure engine 408. In some embodiments, the wiper detection engine 402 can be configured to detect a presence of a wiper in images captured by cameras. Once a wiper is detected in an image, the wiper detection engine 402 can relay this information to the control engine 404. In some embodiments, the control engine 404 can be configured to change camera exposure based on presence of wiper in images. For example, once a wiper in an image is detected, the control engine 404 can instruct the camera exposure engine 408 to decrease ISO settings and shutter speeds of cameras to elongate the cameras' exposure time. At the same time, the control engine 404 can instruct the wiper actuation engine 406 to increase wiper speed such that wipers can move in and out of the cameras' field of views while the cameras are capturing images. In some embodiments, the wiper actuation engine 406 can be configured to actuate wipers. The wiper actuation engine 406 can adjust wiper speed based on instructions or commands received from the control engine 404. In some embodiments, the camera exposure engine 408 can be configured to change ISO settings and shutter speeds of cameras. The camera exposure engine 408 can adjust ISO settings and shutter speeds based on instructions or commands received from the control engine 404.

Figure 5:
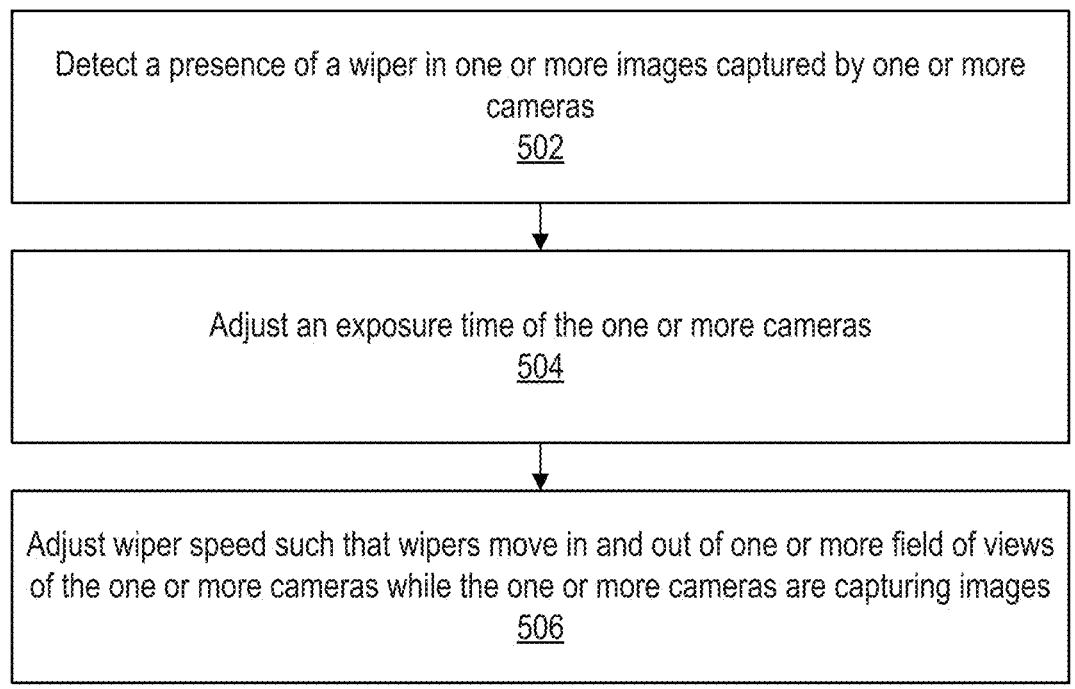
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can detect a presence of a wiper in one or more images captured by one or more cameras. At block 504, the example method 500 can adjust an exposure time of the one or more cameras. At block 506, the example method 500 can adjust wiper speed such that wipers move in and out of one or more field of views of the one or more cameras while the one or more cameras are capturing images.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
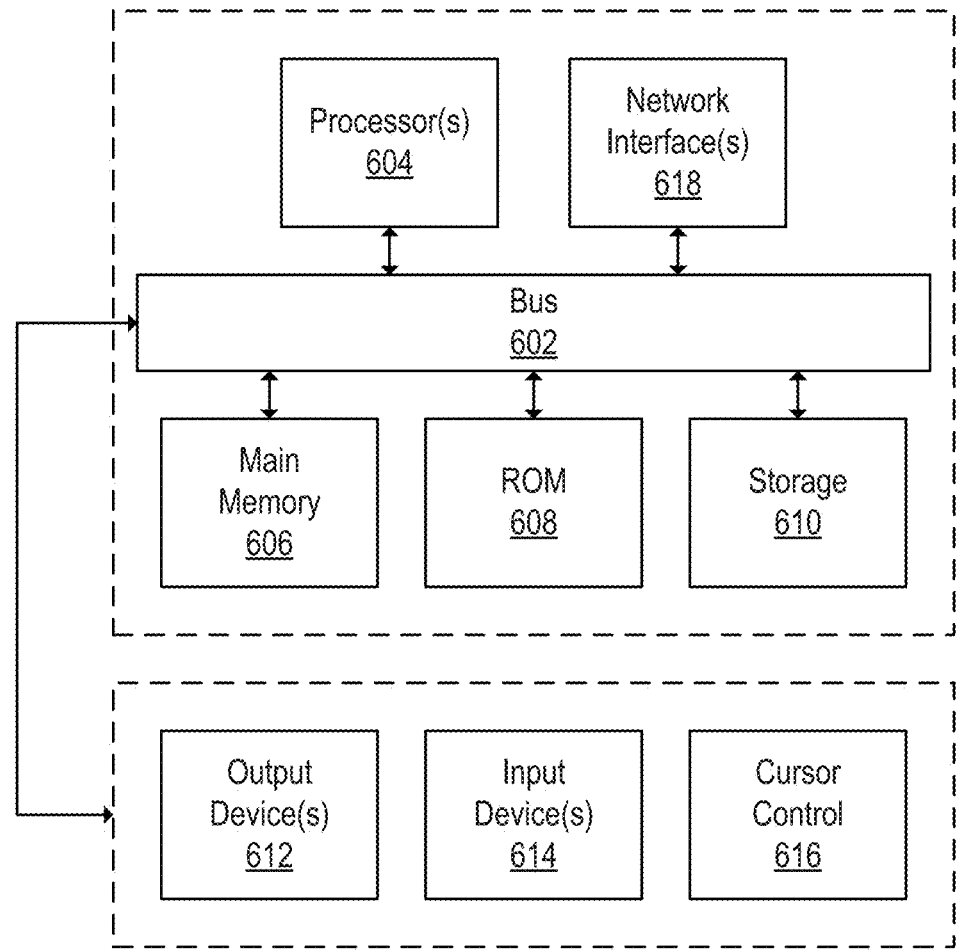
FIG. 6 illustrates a block diagram of a computer system.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for controlling camera exposure to augment a wiper system of a sensor enclosure, the method comprising:
   detecting a presence of a wiper in one or more images captured by one or more cameras;
   adjusting an exposure time of the one or more cameras;
   adjusting wiper speed such that wipers move in and out of one or more field of views of the one or more cameras while the one or more cameras are capturing images;
   capturing images based on the adjusted exposure time and the adjusted wiper speed; and
   processing, based on a processing technique, the captured images to reduce motion blur, wherein the processing technique includes at least one of Lucy-Richardson or Wiener deconvolution technique.

2. The computer-implemented method of claim 1, wherein adjusting the exposure time of the one or more cameras comprises:
   increasing the exposure time of the one or more cameras.

3. The computer-implemented method of claim 2, wherein increasing the exposure time of the one or more cameras comprises:
   decreasing shutter speeds of the one or more cameras.

4. The computer-implemented method of claim 2, wherein increasing the exposure time of the one or more cameras further comprises:
   decreasing ISO settings of the one or more cameras.

5. The computer-implemented method of claim 1, wherein adjusting the wiper speed such that the wipers move in and out of the one or more field of views of the one or more cameras comprises:
   increasing the wiper speed of the wipers.

6. The computer-implemented method of claim 1, wherein the processing technique further includes a machine learning technique.

7. The computer-implemented method of claim 6, wherein the machine learning technique includes a convolutional neural network.

8. The computer-implemented method of claim 1, wherein the wipers comprise three wipers offset to +/−120 degrees from one another.

9. A sensor enclosure, comprising:
   a cover; and
   a base encased by the cover, the base includes a wiper system having three wipers offset to +/−120 degrees from one another to remove moisture and debris from the cover, the wiper system configured to perform:
      detecting a presence of a wiper in one or more images captured by one or more cameras anchored to the base;
      adjusting an exposure time of the one or more cameras;
      adjusting wiper speed such that wipers of the wiper system move in and out of one or more field of views of the one or more cameras while the one or more cameras are capturing images.

10. The sensor enclosure of claim 9, wherein adjusting the exposure time of the one or more cameras comprises:
   increasing the exposure time of the one or more cameras.

11. The sensor enclosure of claim 10, wherein increasing the exposure time of the one or more cameras comprises:
   decreasing shutter speeds of the one or more cameras.

12. The sensor enclosure of claim 10, wherein increasing the exposure time of the one or more cameras further comprises:
   decreasing ISO settings of the one or more cameras.

13. The sensor enclosure of claim 9, wherein adjusting the wiper speed such that the wipers move in and out of the one or more field of views of the one or more cameras:
   increasing the wiper speed of the wipers.

14. The sensor enclosure of claim 9, wherein the processing technique further includes a machine learning technique.

15. The sensor enclosure of claim 14, wherein the machine learning technique includes a convolutional neural network.

16. A sensor enclosure comprising:
   a cover; and
   a base encased by the cover, the base includes a wiper system to remove moisture and debris from the cover, the wiper system configured to perform:
      detecting a presence of a wiper in one or more images captured by one or more cameras anchored to the base;
      adjusting an exposure time of the one or more cameras;
      adjusting wiper speed such that wipers of the wiper system move in and out of one or more field of views of the one or more cameras while the one or more cameras are capturing images;
      capturing images based on the adjusted exposure time and the adjusted wiper speed;
      processing, based on a convolutional neural network, the captured images to reduce motion blur.

* * * * *